Sept. 7, 1943. R. DALLY Re. 22,371
CRYSTAL PICKUP UNIT
Original Filed June 3, 1940 2 Sheets-Sheet 1
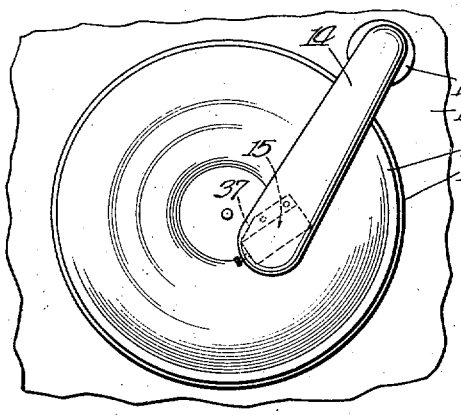
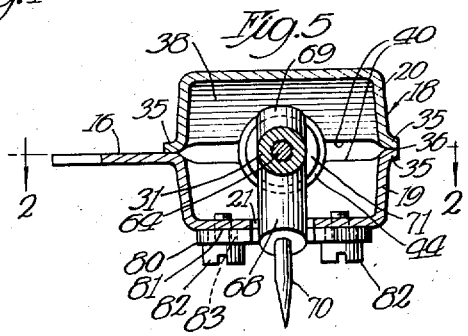
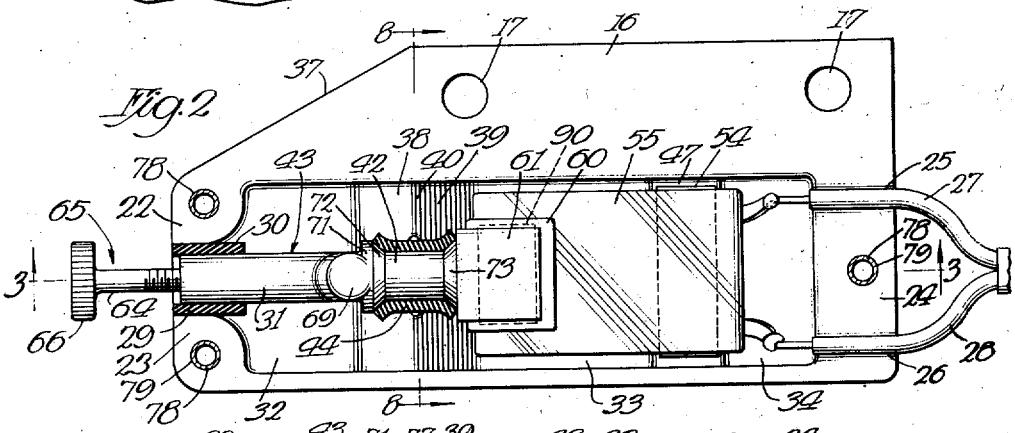
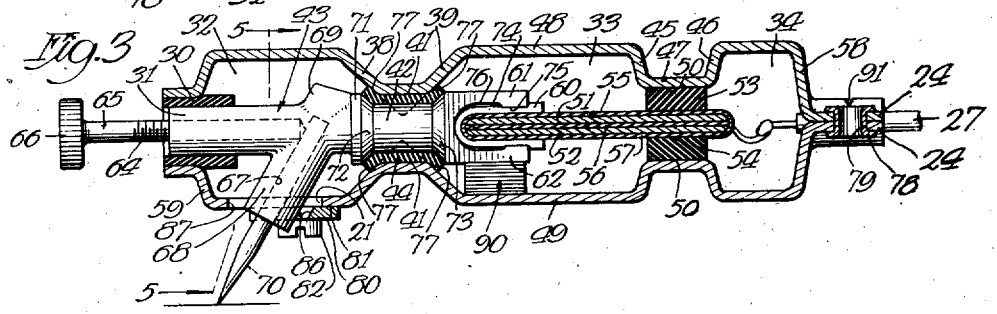
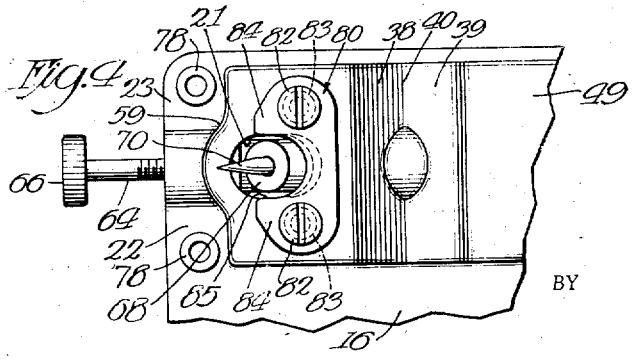
INVENTOR.
Roy Dally
BY
McCaleb & Wendt
ATTORNEYS.

Sept. 7, 1943. R. DALLY Re. 22,371

CRYSTAL PICKUP UNIT

Original Filed June 3, 1940 2 Sheets-Sheet 2

INVENTOR.

BY Roy Dally
McCaleb & Wendt

ATTORNEYS.

Reissued Sept. 7, 1943

Re. 22,371

UNITED STATES PATENT OFFICE 22,371

CRYSTAL PICKUP UNIT

Roy Dally, Racine, Wis., assignor to Webster Electric Company, Racine, Wis., a corporation of Delaware Original No. 2,261,616, dated November 4, 1941, Serial No. 338,519, June 3, 1940. Application for reissue October 16, 1942, Serial No. 462,286

23 Claims. (Cl. 179—100.41)

The present invention relates to pick-up units for tone arms and the like and is particularly concerned with improved pick-ups of the crystal type.

In the pick-up units of the prior art a pressure or a sharp blow against the needle screw would shift the needle chuck assembly in its rubber bearings and result in a permanent displacement of the assembly which might change the characteristics of the pick-up unit. In extreme cases, such a blow might cause breakage of the crystal element which is clamped to the needle chuck assembly in the devices to which I refer.

One of the objects of the present invention is the provision of an improved crystal pick-up unit which is so constructed that it is impossible to displace the chuck longitudinally beyond predetermined limits.

Another object of the invention is the provision of an improved crystal pick-up unit which is provided with thrust bearing means for its chuck by means of which the displacement of the chuck longitudinally of the bearings is positively prevented.

Another object of the invention is the provision of an improved crystal pick-up unit with means for assuring the accurate location of stops on each side of the chuck in order to prevent excessive displacement of the chuck which might cause breakage of the crystal element.

Another object of the invention is the provision of such adjustable accurate stops for the chuck to prevent breakage of the crystal element, which stops are adapted to be adjusted after the entire crystal unit has been assembled, and the chuck assembly has taken its natural position with respect to the strain which is set up inside by the assembly and the various rubber components of the assembly.

Another object of the invention is an improved adjustable stop for the chuck for a crystal pick-up unit which is adapted to permit the adjustment of the chuck stops to compensate for diameter tolerances which are necessary in the die-cast chuck.

Another object of the invention is the provision of an improved crystal pick-up unit which is adapted to reproduce with high fidelity and adapted to be used for a long period of time without necessity for repair or readjustment.

Another object of the invention is the provision of an improved crystal pick-up unit which may be manufactured very economically and which may thus be placed within the means of a larger number of purchasers.

Other objects and advantages of the invention will be apparent from the following description and the accompanying drawings, in which similar characters of reference indicate similar parts throughout the several views.

Referring to the single sheet of drawings accompanying this specification:

Figure 1 is a fragmentary top plan view of a phonograph equipped with a pick-up constructed according to the invention, showing the turntable and tone arm;

Figure 2 is an enlarged horizontal sectional view of a pick-up embodying the invention taken on the plane of the line 2—2 of Figure 5, looking in the direction of the arrows;

Figure 3 is an enlarged vertical sectional view taken on the plane of the line 3—3 of Figure 2 looking in the direction of the arrows;

Figure 4 is an enlarged fragmentary bottom plan view showing the chuck stops;

Figure 5 is an enlarged vertical sectional view taken on the plane of the line 5—5 of Figure 3 looking in the direction of the arrows;

Figure 7:
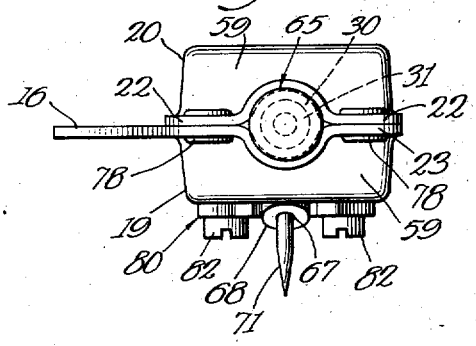
Figure 7 is a front end view of the pick-up unit.
Figure 6:
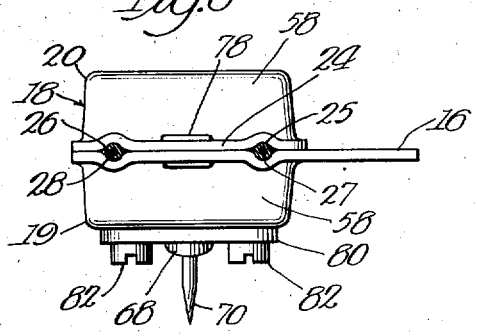
Figure 6 is a rear elevational view of the pick-up unit.
Figure 8:
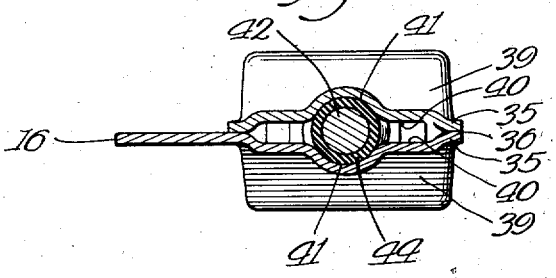
Figure 8 is a sectional view taken on the plane of the line 8—8 of Figure 2.
Figure 9:
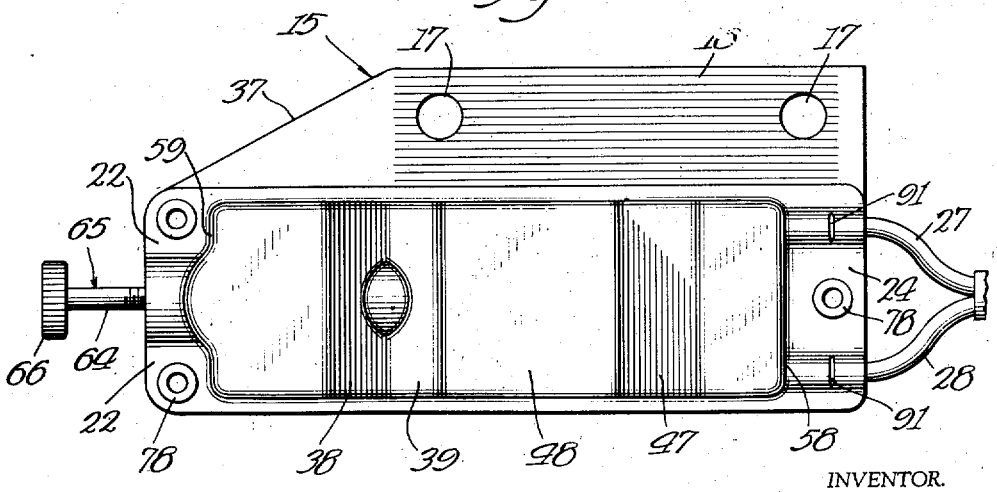
Figure 9 is a top plan view of the unit.

Referring to Figure 1, 10 indicates a support such as the top table of a phonograph housing which may be provided with a rotatable turntable 11 carrying a record 12. The support 10 carries a standard 13 which supports a tone arm 14 for substantially universal movement so that the tone arm can be lifted from the record and so that it may traverse the record as it follows the needle groove.

The arm 14 may be a stamped sheet metal member of channel shape closed at each end and it may support the crystal unit or cartridge 15 at such an angle that substantially tangential tracking of the needle can be secured at a point midway between the innermost and outermost grooves of the record.

The pick-up unit 15 may be supported to an arm 14 by suitable supporting angles which are secured to a supporting flange 16 that is provided with apertures 17 for screw bolts or other securing devices.

The pick-up unit 15 is preferably housed in a stamped sheet metal housing indicated in its entirety by the numeral 18. This housing may consist of a lower housing member 19 and an upper housing member 20, either one of which may carry the supporting flange 16.

The two housing members 19 and 20 may be identical in shape and structure except for the fact that one of these housing members carries the laterally projecting supporting flange 16 and the lowermost of these housing members is provided with an aperture 21 (Fig. 3) for the needle chuck.

In some embodiments of the invention, both the upper and lower housing members may be of similar shape and the supporting flange 16 may be eliminated. Each of these housing members is preferably formed at its ends with the relatively flat attaching flange portions 22, 23, at the left end in Figure 2, and 24 at the right end.

The attaching flange portion 24 is located between a pair of longitudinally extending grooves 25, 26 pressed in the housing member and extending from the outside to the inside. These grooves are for the reception of the insulated conductors 27, 28 which lead to the conductors on the opposite sides of crystals inside the cartridge. The conductors are for the purpose of impressing the electromotive forces generated by the crystal upon an amplifying system.

The conductors 27, 28 are preferably rubber covered conductors having a live resilient rubber covering of circular cross-section which is slightly larger than the aperture made by the two opposed grooves 25, 26. Thus the rubber covered conductors may be clamped in the grooves by the two half-portions of the housing when the housing is assembled and this end of the housing is sealed against moisture.

For the purpose of assuring the securement of the conductors 27, 28 in the grooves 25, 26, one of each of the grooved housing members may be provided with a transverse ridge or deformation which makes a slight ridge 91 on the inside of each of these two grooves. This ridge 91 further clamps the rubber covered conductors and serves as an anchor.

The ends of the conductors may be directly connected to the foil on the crystals, thus eliminating any necessity for any connectors on the crystal unit. Each unit may be provided with conductors of sufficient length for connection to other apparatus.

The attaching flange portions 22 and 23 are in the same plane as the part 24 and comprise substantially flat portions of the housing member which are located on the opposite sides of pressed, partially cylindrical groove 29 formed in this end of each housing and extending from the outside to the interior of the housing.

The groove 29 is for the purpose of receiving a rubber bearing 30 for a chuck trunnion 31, the rubber bearing 30 being in the form of a tubular resilient rubber member fitting in the groove after it has been applied to the cylindrical chuck trunnion 31. The trunnion and bearing assembly 30, 31, is preferably slightly larger than the groove 29 so that when the housing members are assembled to form a bearing aperture at 29, they compress the rubber 30.

The housing members 19 and 20 are preferably formed with what may be termed a plurality of separate chambers 32, 33, 34. Actually, these chambers are in the form of a plurality of substantially rectangular pan-shaped impressions in the housing in which they are formed for a purpose further to be described.

At the outer edge of each housing member adjacent the open side, the housing is provided with an outwardly extending lip 35, the outermost surface 36 of which is located in the same plane as the attaching flanges 22, 23, 24. This lip is of course not necessary where the supporting flange 16 is located, as that flange serves the same purpose.

For the purpose of permitting a wider angular adjustment of the cartridge 15 inside a tone arm 14, one end of the otherwise substantially rectangular supporting flange 16 is beveled off at 37, Fig. 1. When the two housing members are secured together, as shown in Fig. 5, the lips 35 on one side, and the lip 35 and flange 16 on the other side engage each other and the attaching flange portions 23, 24 engage the same flange portions on the other housing member in such manner that the housing is completely closed except for the conductor grooves 25, 26 and the bearing groove 29. These are of course closed by the rubber insulated conductors placed in them and by the rubber covered trunnion 31.

The two housing members are also formed with the diagonally inwardly extending flanges 38, 39 which are joined along a ridge 40 except at a point midway between the sides of the cartridge where this ridge 40 and the flanges 38, 39 are varied in shape to form a partially cylindrical groove 41 extending axially of the cartridge. The partially cylindrical grooves 41 in the two housing members form a substantially cylindrical aperture between the chambers 32 and 33 except for the fact that the two ridges 40 do not contact each other internally and the cylindrical opening is not completely defined.

The partially cylindrical surface 41, however, in each cartridge forms sufficient of a cylindrical bearing to receive a cylindrical bearing portion 42 on the needle chuck 43 when this bearing is covered with a tubular rubber member 44.

The housing members are also provided with inwardly extending flange portions 45, 46 and the flat portion 47 which is spaced inwardly of the upper and lower walls 48, 49 in such manner that flat clamping surface 50 is provided on each housing member. These flat clamping surfaces 50 are parallel to each other and parallel to the crystals 51, 52 and the crystals 51, 52 are clamped by these surfaces through the agency of the flat resilient deformable clamping blocks 53, 54.

These blocks may be made of rubber or other suitable live resilient material such as printer's roll composition, and the blocks are secured to the clamping surfaces 50 by suitable rubber cement.

The chamber 34 serves as a connection chamber for connecting the conductors 27, 28 to the conducting layers 55, 56, 57 which are outside of and interposed between the crystals 51, 52. Referring to Fig. 3, the end of the cartridge is closed by means of the substantially flat end wall portions 58 at the right and by the curved end wall portions 59 at the left in Fig. 4.

As the crystal members in the present pick-up unit are disposed in a plane parallel to the plane of the record, they will of course be cut appropriately with respect to the axes of the crystal from which they are made, so that the twisting action of the chuck under the influence of the needle will generate electromotive forces that are collected by means of the conductors 55, 56, 57, and transmitted through conductors 27, 28. The conductors 55, 56, 57, may be connected in various ways, such as series or parallel, as disclosed in my prior Patent No. 2,145,389 of January 31, 1939, according to the characteristics desired.

The crystal member assembly 51, 52, 55—57, is clamped at its right end between the resilient blocks 53, 54 which are compressed against the crystal assembly by the clamping surfaces 50 of the housings when they are assembled. The size of the resilient blocks 53 and 54 is such that these blocks are suitably compressed when the halves of the housing are assembled as shown in Figure 3. The characteristics of the crystal unit may be predetermined by suitable compression of the resilient blocks 53 and 54.

The other end of the crystal assembly is covered by a strip 60 of live resilient rubber or printer's roll composition of sufficient width to extend beyond the borders of the clamping jaws 61, 62 of the chuck unit and of sufficient length so that it may be folded to substantially U-shape about the end of the crystal assembly and interposed between the jaws 60, 62, and the crystal assembly.

This resilient cushion 60 between the chuck and the crystal assembly is adapted to give predetermined cushioning connection between the crystal assembly and the chuck. The rubber strip 60 is compressed and clamped between the opposed jaws 61, 62. The pressure placed upon the crystal assembly and rubber strip 60 can be varied or adjusted by the application of pressure to the jaws 61, 62 to bend them into closer engagement with the rubber strip 60 and crystal assembly.

The chuck unit 43 preferably comprises a die-cast metal member which is provided with a substantially cylindrical trunnion 43 at its outer end, a cylindrical trunnion 42 and the clamping jaws 61, 62. The trunnion 43 is provided with an axially extending threaded aperture 63 for receiving the threaded shank 64 of a needle screw 65 having knurled head 66.

Threaded aperture 63 communicates with a needle socket aperture 67 which is also cylindrical and which is located in a diagonally downward and forward needle supporting lug 68. The needle supporting lug 68 also extends upward slightly at 69 for the purpose of providing sufficient body for the needle socket 67 to communicate with the bore 63 in order that the needle screw 65 may clamp against the needle 70.

The diagonally forward slant of the needle lug 68 and socket 67 is such that it gives the needle a suitable tracking characteristic. That is, the needle is disposed at an obtuse angle to the record, extending backward from the direction of movement of the record so that it may move along the groove without so much of a tendency to cut in the groove.

The chuck 43 is also provided with a collar 71 of larger size than the trunnion 42 and with a frusto-conical portion 72 between the collar 71 and trunnion 42. It also has another frusto-conical portion 73 between the trunnion 42 and the clamping flanges 61 and 62. The groove or aperture 74 between the clamping flanges 61 and 62 is preferably of substantially U-shape conforming substantially to the curvature of the rubber strip 60 except that there is a flat rectangular clamping surface 75 on each side of each clamping flange 61 and 62 and there is a suitable clearance at 76 over the rest of the groove 74.

The housing is also provided with inner diagonally extending surfaces at each end of the cylindrical aperture 41 as indicated at 77. One element of these diagonal surfaces is in the same location as a frusto-conical surface would be. In some embodiments of the invention, complete frusto-conical surfaces might be provided on both ends of the bearing 41, but the diagonally extending surfaces may perform the same function in simpler embodiments of the invention.

The rubber sleeve 44 of live resilient rubber is of such size that it extends over the cylindrical trunnion 42 and frusto-conical surfaces 72, 73, and by virtue of its tension, conforms itself to these surfaces. The assembly of the trunnion 42 and rubber sleeve 44 is slightly larger than the aperture 41 in which this trunnion is to be mounted. Consequently the rubber sleeve 44 is compressed and engaged at each end of the trunnion between the surfaces 77, 73 and 72, 73.

These surfaces act as thrust surfaces for preventing axial shift of the chuck and the resiliency of the rubber sleeve returns the chuck to its original position after any blow or shock. The amount of compression placed on the rubber sleeve 44, as well as the blocks 53, 54, rubber cushion 60 and rubber sleeve 30, is predetermined for the purpose of securing the most desirable characteristics in the pick-up unit.

The two halves of the housing may be secured together by bolts and nuts or any convenient fastening means, but are preferably permanently secured together with these rubber parts in a state of predetermined compression by means of a plurality of tubular rivets 78 passing through aperture 79 in the attaching flanges 22, 23 and 24, and spun or riveted over on each side of the flanges.

The unit is also preferably provided with means for providing an adjustable stop limiting the motion of the chuck 43 and this adjustable member 80 may be located on the lower face 81 of the lower housing member and secured in place by a pair of screw bolts 82 which are threaded into threaded bores in the lower housing. This stop member 80 may comprise a small sheet metal member provided with a pair of enlarged apertures 83 for reception of the screw bolts 82.

The enlarged apertures permit the lateral movement of the stop member 80 on the screw bolts 82 until they are driven home. The stop member 80 may be a strip of metal having a pair of laterally projecting legs 84 separated by a substantially U-shaped notch or groove 85.

The inner surface of the notch or groove acts as a stop surface for the depending lug 68 of the chuck 43. The boundary 85 of the notch acts to limit the effective size of aperture 21 in the lower side of the housing and this stop member definitely limits the amount of lateral displacement of the reproducing stylus.

By means of this adjustable plate, it is possible to provide accurate stops on each side of the chuck to prevent excessive displacement which in turn would readily cause breakage of the crystal element. The plate is preferably adjusted after the entire crystal cartridge assembly has been made and after the chuck assembly has taken its natural position with respect to the strain that is set up inside the assembly and by the compression that is placed upon the rubber and other components.

The notch 85 may be beveled at 86 to correspond in slant at its rear surface to the surface of the depending lug 68 in some embodiments of the invention.

Another advantage of this adjustable stop is that the stop may be made accurate and adjusted to compensate for the diameter tolerances that are necessary in the die-cast chuck. Of course, the plate 80 is so adjusted that it is not in metallic contact with any part of the chuck 43 except when the chuck is subjected to excessive lateral displacement in any of three directions. In the other direction the edge surface 87 of the aperture 21 at the front may be made to serve as a stop surface.

In addition to the rubber elements previously described, the unit is also preferably provided with an additional rubber block 90 which is rectangular in plane and elevation and which is compressed between the lower flange 62 of the chuck and the lower wall 49 of the housing.

This block may be made of rubber or printer's roll composition and by means of it the resilient torsional characteristics of the assembly are modified and altered so as to eliminate some undesirable characteristics. This block is also compressed when the unit is assembled and it is secured by cement to the lower housing half. It is preferably of sufficient length to engage over the full width of the flange 62.

It should also be noted that the thrust surfaces 73, 77, 74, 77 on the chuck may also be located at some other bearing such as the bearing 30 in other embodiments of the invention.

It will thus be observed that I have invented an improved crystal unit cartridge which is adapted to be manufactured very economically because most of its parts are made by stamping operations and there is a minimum amount of machining necessary on any part of the unit.

The chucks are die-cast and the unit requires a minimum amount of rubber in its manufacture.

The needle chuck is protected against excessive lateral displacement by positive metallic stops and it is protected against longitudinal displacement, such as might change its characteristics or damage the crystal, by a resilient rubber bearing having thrust surfaces. The present structure protects the crystal element against breakage by pressure or sharp blows on the chuck or needle and the present crystal unit is adapted to give faithful reproduction although it may be manufactured in large quantities at a very low cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a crystal pick-up unit, the combination of a housing of substantially rigid material, said housing being provided with means for securing one end of a crystal therein and having a pair of axially extending bores for supporting the trunnions of a chuck, a crystal secured in said housing, a chuck having one end secured to said crystal, said chuck having a pair of trunnions and having a needle-supporting socket, one of said trunnions being provided with thrust surfaces whereby axial displacement of the chuck in the housing is prevented.

2. In a crystal pick-up unit, the combination of a housing of substantially rigid material, said housing being provided with means for securing one end of a crystal therein and having a pair of axially extending bores for supporting the trunnions of a chuck, a crystal secured in said housing, a chuck having one end secured to said crystal, said chuck having a pair of trunnions and having a needle-supporting socket, one of said trunnions being provided with thrust surfaces whereby axial displacement of the chuck in the housing is prevented, said housing being made of stamped sheet metal members secured together and having a pair of flat surfaces engaging resilient non-metallic blocks for clamping one end of the crystal.

3. In a crystal pick-up unit, the combination of a housing of substantially rigid material, said housing being provided with means for securing one end of a crystal therein and having a pair of axially extending bores for supporting the trunnions of a chuck, a crystal secured in said housing, a chuck having one end secured to said crystal, said chuck having a pair of trunnions and having a needle-supporting socket, one of said trunnions being provided with thrust surfaces whereby axial displacement of the chuck in the housing is prevented, said chuck trunnions being covered with rubber sleeves and one of said sleeves extending over said thrust surfaces.

4. In a crystal pick-up unit, the combination of a housing of substantially rigid material, said housing being provided with means for securing one end of a crystal therein and said housing having a longitudinally extending bore for supporting the trunnion of a chuck, a crystal secured in said housing, and a chuck having one end secured to said crystal, said chuck having means for supporting a stylus, and said housing being formed at the opposite ends of said bore with thrust shoulders, said trunnion being provided with a bearing portion and with thrust shoulders oppositely disposed on the opposite sides of said bearing portion for engagement with the thrust shoulders on said housing to prevent axial displacement of the chuck in the housing.

5. In a crystal pick-up unit, the combination of a housing of substantially rigid material, said housing being provided with means for securing one end of a crystal therein and said housing having a longitudinally extending bore for supporting the trunnion of a chuck, a crystal secured in said housing, and a chuck having one end secured to said crystal, said chuck having means for supporting a stylus, and said housing being formed at the opposite ends of said bore with thrust shoulders, said trunnion being provided with a bearing portion and with thrust shoulders oppositely disposed on the opposite sides of said bearing portion for engagement with the thrust shoulders on said housing to prevent axial displacement of the chuck in the housing, said chuck trunnion having its bearing portion and its thrust shoulders covered with a resilient sleeve and said sleeve being compressed in the longitudinally extending bore of said housing.

6. A chuck for crystal reproducing cartridges comprising a rigid member having a stylus supporting portion provided with a diagonally extending socket adapted to receive a stylus shank, said chuck having an outwardly extending portion provided with a threaded bore communicating with said socket and threaded means in said latter bore for engaging the shank of a stylus, and a bearing for said chuck comprising a substantially cylindrical portion bordered by thrust shoulders at each end thereof, said shoulders forming thrust members for engaging with a housing bearing to prevent axial movement of said chuck.

7. A reproducer chuck assembly comprising a metal chuck having a pair of axially aligned trunnions and having a body member provided with a needle socket, one of said trunnions being formed with a pair of oppositely disposed thrust surfaces, a rubber sleeve element on said latter trunnion and extending outward over said thrust surfaces and a housing having a bearing aperture for engaging said bearing, said housing also having surfaces which are opposed to the outer surface of said rubber-covered trunnion whereby axial movement of the trunnion in its bearing is prevented.

8. A reproducer chuck assembly comprising a metal chuck having a pair of axially aligned trunnions and having a body member provided with a needle socket, one of said trunnions being formed with a pair of oppositely disposed thrust surfaces, a rubber sleeve element on said latter trunnion and extending outward over said thrust surfaces and a housing having a bearing aperture for engaging said bearing, said housing also having surfaces which are opposed to the outer surface of said rubber-covered trunnion whereby axial movement of the trunnion in its bearing is prevented, said housing comprising a pair of stamped sheet metal members and said bearing aperture being formed by two registering grooves pressed in a ridge formed between two diagonal surfaces on said housing.

9. A chuck for crystal reproducing cartridges comprising a rigid member having a stylus supporting portion provided with a diagonally extending socket adapted to receive a stylus shank, said chuck having an outwardly extending portion provided with a threaded bore communicating with said socket and threaded means in said latter bore for engaging the shank of a stylus, and a bearing for said chuck comprising a substantially cylindrical portion bordered by thrust shoulders at each end thereof, said shoulders forming thrust members for engaging with a housing bearing to prevent axial movement of said chuck, and a compressible bushing of live resilient material extending over said bearing portion and curved outwardly on said thrust shoulders for engaging a restricted portion of said housing.

10. In a crystal reproducing cartridge, a pair of rigid housing members formed with a recesss for receiving a crystal member, said housing members being provided with resilient blocks for engaging on the opposite sides of one end of said crystal member and said housing having at its opposite end a restricted aperture forming a bearing for a chuck, a stylus chuck connected to said crystal and extending longitudinally of said housing, said stylus chuck being formed with a stylus socket and means for securing a stylus shank in said socket, said chuck being formed with a portion of reduced size at said restricted aperture bordered by enlargements at each end of said latter portion, and a covering of live resilient material compressed between the restricted aperture in said housing and the reduced portion of said chuck for securing the chuck against axial movement and permitting free floating movement of said chuck.

11. In a crystal unit, the combination of a pair of metallic housing members of substantially similar shape except that one of said housing members is provided with a needle aperture, each housing member being provided with a border rim for engaging the border rim on the other housing to effect a closure at the edges of the housing members and each housing member being provided with a flat attaching flange located at the end thereof, a crystal unit assembly in said housing including a crystal secured to a chuck, said chuck having bearings and resilient means interposed between said assembly and said housing and brought into resilient clamping engagement with said assembly when the housing is assembled, said housing members and said chuck being provided with thrust bearing surfaces for preventing axial displacement of said chuck beyond a predetermined piont.

12. A chuck for crystal reproducing cartridges, comprising a metal member formed with a diagonally extending socket for a stylus, said chuck also having a pair of aligned trunnion members, one of said trunnion members being provided with a threaded aperture for a clamping screw, said threaded aperture communicating with the stylus socket, one of said trunnion members being provided with opposed thrust surfaces for reacting against surfaces in the housing to prevent axial movement of the chuck.

13. A chuck for crystal reproducing cartridges, comprising a metal member formed with a diagonally extending socket for a stylus, said chuck also having a pair of aligned trunnion members, one of said trunnion members being provided with a threaded aperture for a clamping screw, said threaded aperture communicating with the stylus socket, one of said trunnion members being provided with opposed thrust surfaces for reacting against surfaces in the housing to prevent axial movement of the chuck, said chuck having a sleeve of live resilient material on said trunnion and extending outwardly over said thrust surfaces.

14. A chuck for crystal reproducing cartridges, comprising a cast metal member formed with a cylindrical trunnion portion extending rearwardly from a diagonally depending socket portion, said socket portion having a socket for receiving a stylus, and said chuck having a forwardly extending threaded bore communicating with said socket, a threaded clamping member in said latter bore for engaging a stylus, and a pair of tapered surfaces located on said trunnion at each end of said cylindrical portion, said tapered portions and cylindrical portion of said trunnion being covered with a tubular soft resilient covering adapted to serve as a movable bearing member for permitting predetermined movement of said chuck and preventing excessive longitudinal movement of said chuck.

15. In a crystal pick-up unit, the combination of a housing of substantially rigid material, said housing being provided with means for securing one end of a crystal therein and having an axially extending bore for supporting the trunnion of a chuck, a crystal secured in said housing, a chuck separate from the crystal and having one end secured to said crystal, said chuck having a trunnion and having a needle-supporting socket extending transversely to the axis of said trunnion, said trunnion being provided with a thrust surface whereby axial displacement of the chuck in the housing is prevented, said chuck trunnion being covered with a rubber sleeve and said sleeve extending over said thrust surface.

16. A reproducer chuck assembly comprising a metal chuck having a trunnion and having a body member provided with a needle socket, said trunnion being formed with an inwardly facing thrust surface, a rubber sleeve element on said trunnion and extending outward over said thrust surface, and a housing having a bearing aperture for supporting said trunnion, said housing also having a surface which is opposed to the thrust surface of said rubber-covered trunnion whereby inward movement of the trunnion in its bearing is prevented.

17. A chuck for crystal reproducing cartridges comprising a rigid member having a stylus supporting portion provided with a diagonally extending socket adapted to receive a stylus shank, said chuck having an outwardly extending portion provided with a threaded bore communicating with said socket and threaded means in said latter bore for engaging the shank of a stylus, and a bearing for said chuck comprising a substantially cylindrical portion bordered by a thrust shoulder at one end thereof, said shoulder forming thrust means for engaging with a housing bearing to prevent axial movement of said chuck, and a compressible bushing of live resilient material extending over said bearing portion and curved outwardly on said thrust shoulder for engaging a restricted portion of said housing.

18. In a crystal reproducing cartridge, a pair of rigid housing members formed with a recess for receiving a crystal member, said housing members being provided with resilient blocks for engaging on the opposite sides of one end of said crystal member and said housing having at its opposite end a restricted aperture forming a bearing for a chuck, a stylus chuck connected to said crystal and extending longitudinally of said housing, said stylus chuck being formed with a stylus socket and means for securing a stylus shank in said socket, said chuck being formed with a portion of reduced size at said restricted aperture bordered by an enlargement located outwardly of said latter portion, and a covering of live resilient material compressed between the restricted aperture in said housing and the reduced portion of said chuck for securing the chuck against inward movement and permitting free floating movement of said chuck.

19. In a crystal unit, the combination of a pair of metallic housing members, one of said housing members being provided with a needle aperture, each housing member being provided with a border rim for engaging the border rim on the other housing to effect a closure at the edges of the housing members and each housing member being provided with a flat attaching flange located at the end thereof, a crystal unit assembly in said housing including a crystal secured to a chuck, said chuck having a trunnion and resilient means interposed between said chuck and said housing and brought into resilient clamping engagement with said chuck when the housing is assembled, said housing members and said chuck being provided with a thrust surface for preventing inward displacement of said chuck beyond a predetermined point.

20. A chuck for crystal reproducing cartridges, comprising a metal member formed with a transversely extending socket for a stylus, said chuck also having a trunnion member, said member being provided with a threaded aperture for a clamping screw, said threaded aperture communicating with the stylus socket, said trunnion members being provided with a thrust surface for reacting against a surface in the housing to prevent inward movement of the chuck.

21. A chuck for crystal reproducing cartridges, comprising a metal member formed with a socket for a stylus, said chuck also having a trunnion member, said metal member being provided with a threaded aperture for a clamping screw, said threaded aperture communicating with the stylus socket, said trunnion member being provided with an inwardly facing thrust surface for reacting against a surface in the housing to prevent inward movement of the chuck, said chuck having a sleeve of live resilient material on said trunnion and extending outwardly over said thrust surface.

22. A chuck for crystal reproducing cartridges, comprising a rigid member formed with a cylindrical trunnion portion extending rearwardly from a socket portion, said socket portion having a socket for receiving a stylus, and said chuck having a forwardly extending threaded bore communicating with said socket, a threaded clamping member in said latter bore for engaging a stylus, and a tapered surface located on said trunnion at one end of said cylindrical portion, said tapered portion and cylindrical portion of said trunnion being covered with a tubular soft resilient covering adapted to serve as a movable bearing member for permitting predetermined movement of said chuck and preventing excessive longitudinal movement of said chuck.

23. In a crystal reproducing cartridge, a pair of housing members formed with a recess for receiving a crystal member, resilient means for clamping one end of the crystal member in said housing, a chuck engaging the other end of said crystal member, said chuck having a trunnion for support by said housing, said housing having a restricted portion for engaging said trunnion, and said trunnion and housing having opposed thrust surfaces for preventing inward movement of said chuck, which might damage the crystal, said chuck having a stylus socket and having a threaded member engaged in a threaded bore communicating with said socket, and resilient means surrounding said trunnion and compressed in said restriction in said housing, said resilient means also extending outward between the thrust surface on the housing and the opposed thrust surface on the chuck.

ROY DALLY.